United States Patent [19]
Postlewaite et al.

[11] Patent Number: 5,854,891
[45] Date of Patent: Dec. 29, 1998

[54] SMART CARD READER HAVING MULTIPLE DATA ENABLING STORAGE COMPARTMENTS

[75] Inventors: William M. Postlewaite; Kim J. Vogel, both of Tarpon Springs; Jason Maynard; Vincent Poole, both of Tampa, all of Fla.

[73] Assignee: Tritheim Technologies, Inc., Tarpon Springs, Fla.

[21] Appl. No.: 694,882

[22] Filed: Aug. 9, 1996

[51] Int. Cl.⁶ .................................................. G06F 11/00
[52] U.S. Cl. ..................................................... 395/188.01
[58] Field of Search ....................... 395/188.01, 187.01, 395/186, 282; 380/4; 364/286.5, 286.4

[56] References Cited

U.S. PATENT DOCUMENTS

| | | | |
|---|---|---|---|
| 4,652,990 | 3/1987 | Pailen et al. | 380/4 |
| 4,683,553 | 7/1987 | Mollier | 380/4 |
| 4,747,139 | 5/1988 | Taaffe | 380/44 |
| 4,799,153 | 1/1989 | Ham et al. | 395/187.01 |
| 5,212,279 | 5/1993 | Schafer | 528/184 |
| 5,222,133 | 6/1993 | Chou et al. | 380/4 |
| 5,293,424 | 3/1994 | Holtey et al. | 380/23 |
| 5,329,623 | 7/1994 | Smith et al. | 395/187.01 |
| 5,353,124 | 10/1994 | Chou et al. | 358/400 |
| 5,375,037 | 12/1994 | LeRoux | 361/684 |
| 5,448,045 | 9/1995 | Clark | 235/382 |
| 5,497,464 | 3/1996 | Yeh | 395/200.01 |
| 5,500,517 | 3/1996 | Cagliostro | 235/486 |
| 5,540,597 | 7/1996 | Budman et al. | 439/77 |
| 5,564,055 | 10/1996 | Asnaashari et al. | 395/800 |
| 5,584,043 | 12/1996 | Burkart | 395/188.01 |
| 5,590,193 | 12/1996 | Le Roux | 395/188.01 |
| 5,596,739 | 1/1997 | Kane et al. | 395/187.01 |
| 5,610,981 | 3/1997 | Mooney et al. | 380/25 |
| 5,615,393 | 3/1997 | Kikinis et al. | 395/887 |

OTHER PUBLICATIONS

GemPlus Cord Intl., GPR 400 Compact Smart Card Reader Writer.

*Primary Examiner*—Robert W. Beausoliel, Jr.
*Assistant Examiner*—Scott T. Baderman
*Attorney, Agent, or Firm*—Ronald E. Smith

[57] ABSTRACT

A security device for operating protected programs or data, or other functions performed by or within computers, the security device having both hardware and software keys and a reader for accepting smart cards. The smart card reader communicates with a control module having segmented non-volatile memory. Data from plural smart cards is entered into segmented NVM through the smart card reader. Each segment of segmented NVM creates a virtual token essentially duplicating enabling ability of the corresponding smart card or token. The control module has processing and memory means for encrypting and decrypting commands and recognizing encrypted passwords. The control module also has a plurality of interface apparatuses for enabling communicable connection to computers. When one or more virtual tokens is created by transfer of data from a smart card or cards, the smart card may be safely stored or discarded. A computer connected to the security device may be operated to execute functions which are protected in the sense of access being denied in the absence of keys stored in one or more virtual tokens.

9 Claims, 1 Drawing Sheet

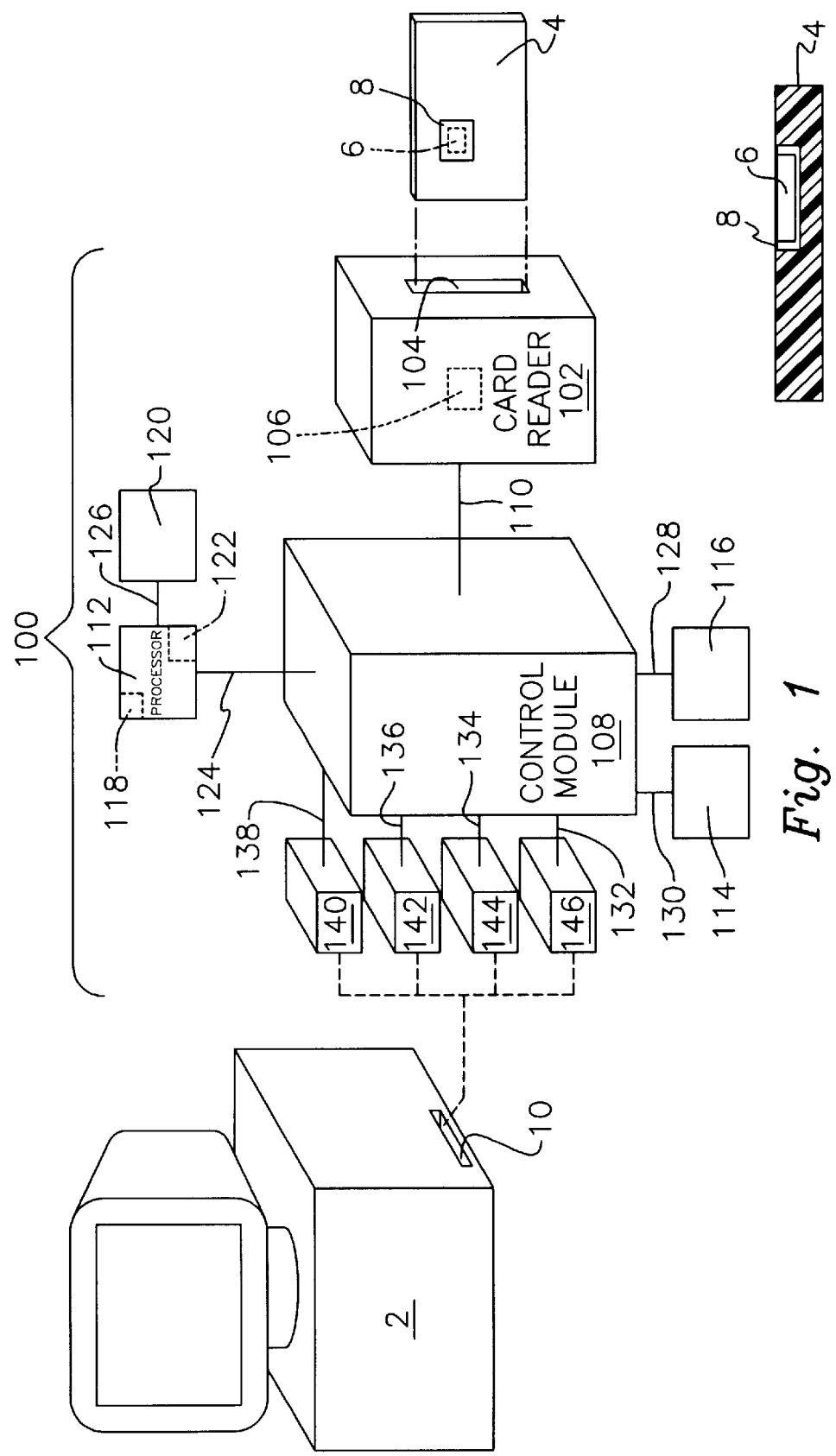

SMART CARD READER HAVING MULTIPLE DATA ENABLING STORAGE COMPARTMENTS

BACKGROUND OF THE INVENTION

1. Field of the Invention

The present invention relates generally to computer peripheral devices, and more particularly to devices for selectively enabling "smart" cards to perform certain functions when placed in communication with a computer. The device accepts and retains enabling data, thereby replacing enabling hardware bearing electronically encoded algorithms for enabling different software to operate a computer by the smart card, for opening paths of communications limited to selected types of transactions, and for securing the computer from unauthorized access.

2. Description of the Prior Art

Modern society is moving towards ever greater reliance upon electronic transactions relating to information and finance. Computers communicate with and process accounts owned by and transactions conducted by individuals. These accounts and transactions must be rendered safe from unauthorized interference and access. The nationally extending system of computers, or national grid, conducting this activity may be accessed by, in addition to computer terminals equipped to do so, computers working in tandem with small, portable enabling cards.

Previously, most such cards had a magnetic strip which could be read by a computer. However, these cards are quite limited in their abilities. Most are employed as enabling devices opening paths of communication to enable a computer to accept commands relating to transactions. Magnetic strip cards are being superseded by smart cards having internal memory and expanded capabilities. Indeed, there is an ever increasing trend to utilization of smart cards to interact with the national grid.

As smart cards supplant conventional magnetic strip enabling cards, new needs for expanded abilities in one card and for security arise. New abilities or functions include ability to communicate with different computers and also to be compatible with different computer operating software. This versatility is lacking in magnetic strip cards. However, as abilities increase, so does the potential for abuse of electronic transactions due to unauthorized access to computer programs which control bank and other financial accounts, and other sensitive matters.

Since software is distributed on transportable media, such as diskettes and compact disks, unauthorized copying is easily performed by individuals having even the least sophisticated equipment. Estimates of commercial pirated software in 1995 placed losses at over $16 million.

Security of computers, programs, and data, such as financial accounts and other sensitive matters has come to depend upon security systems combining both hardware and software. Locks, or enabling encryption of data processors, are combined with data processing chips (also known as keys), which must be connected to the computer before the computer or software will run. These combination systems are the most secure, but also are expensive, cumbersome and limit the number of software programs which can be used on a computer at any one time. Because of these significant problems, the use of this type of system has been restricted to expensive software packages; it is not economical for large volume, low price software publishers, and is price-prohibitive for individuals who have large numbers of software packages installed on their computers. Although hardware/software systems are expensive, cumbersome, and limit applications, they do have several advantages. They offer a very high degree of protection; they allow the user to make unlimited back-ups of the software and data; they also have the advantage of being portable, transferable from computer to computer; and they are invisible to a user once the key is installed in a computer.

A readily usable form of key is the smart card. Smart cards are small, thin substrates having memory for storing encryption or operation enabling programs, or both, as well as interface hardware for communicable connection to a computer or peripheral device. Smart cards are limited, however, in that once the encryption or enabling program is written onto the card, the card is then limited to the abilities conferred by the written program. A user may be required to possess many smart cards to enable one computer to operate or perform a variety of tasks.

SUMMARY OF THE INVENTION

The present invention enables computer users to use multiple smart cards during the normal operation of their computer without inserting a plurality of physical smart cards into a smart card reader. One smart card may, for example, be required to access the computer, another to copy protect valuable software, another to access the Internet, and still another to purchase goods and services over the Internet with a credit card. Each of these actions once required the user to insert a different smart card into his or her computer. Multiple smart cards are superseded by virtual tokens created by the invention. The "virtual tokens" are perhaps better described as "virtual smart cards" because each of them replaces a physical smart card. Significantly, a single smart card reader of this invention reads and stores in different segments of its memory the data from a plurality of smart cards so that a customer having multiple smart cards for multiple applications need make but one insertion of each card into the novel smart card reader. Thus, when a consumer purchases a new application program that includes a smart card for access, or receives a new credit card that comes with a smart card for access, or the like, the new smart card need be inserted into the novel smart card reader a single time only, after which it may be stored or discarded as it will no longer be needed. Accordingly, when a user switches from a first application program, for example, to a second, said user need not insert a second physical smart card into the novel smart card reader to enable such second application because said novel smart card reader will access a virtual smart card from its memory and activate the second application. The novel smart card reader performs the same function for multiple applications, thereby removing the requirement that a user successively insert a plurality of physical smart cards when using a succession of applications that prior to this invention would have required such insertions.

The present invention provides apparatus for compiling virtual tokens (virtual smart cards) stored in non-volatile memory (NVM) associated with a card reader. The NVM device may either be contained within a card reader which is connectable to a computer, or alternatively, may be integral with a computer. In the latter case, the invention includes apparatus enabling communication between the card reader and the computer.

Enabling data is loaded into NVM through smart cards read by the card reader. The NVM is segmented, each segment being dedicated to one virtual token bearing enabling data received from any one smart card. Once enabling data is loaded, it is not alterable by the computer with which it is associated, nor by any computer not specifically equipped to modify the NVM. The NVM is contained within a control module having plural interface apparatuses enabling communicating connection to the computer.

In use in a computer, execution of protected software is dependent upon presence or detection and verification of encryption data or keys contained in the virtual token or installed smart card. If a key is not present, the software will not operate.

The card reader, therefore, can perform many individual functions due to having a plurality of virtual tokens. Also, simultaneous operation of several applications is enabled. Furthermore, the card reader can enable any of many computers, due to having a variety of interface apparatuses. Control is retained by the possessor of the card reader. Firstly, the possessor can load selected data into an NVM segment, thereby creating a virtual token. Secondly, the card reader can be a hardware key necessary for enabling a host computer to perform selected functions or transactions controlled by the virtual tokens.

The enabling function may operate at different levels of sophistication or performance, depending upon its programming. For example, programs may run while copying is prevented. Alternatively, programs or data may be automatically encrypted while running, to assure security of, for example, financial transactions or transmission of sensitive data. Security measures may rely upon several levels of enablement, such as requiring a password in addition to satisfying other predetermined criteria.

Part of the security features may be installed at the time of manufacture, such as encryption of passwords and algorithms. Such features would be loaded into a virtual token within the control module.

It will therefore be apparent that security features may be obtained at minimal cost. The hardware necessary to practice the invention is well known. Encryption and decryption are likewise well known. Therefore, production costs will be minimized to the point that mass distribution of the novel security system may be accomplished at nominal cost to individual consumers.

The omnipotent nature of the enabling device, after creation of many virtual tokens, is such that refusal of requests for loaning the enabling device will be accepted. For example, close acquaintances may request software or the like for copying purposes. In many cases, individuals are reluctant to refuse such requests despite potential for illicit copying and access. However, if the request must necessarily include access to all areas enabled by the novel device, such refusal becomes psychologically easier.

Accordingly, it is a principal object of the invention to provide a security system for operating computers which provides both a physically removable key and also an encrypted software key for successful operation of the computer.

It is another object of the invention to provide an interface device which operably communicates between smart cards and a computer.

It is a further object of the invention to provide a segmented memory which serves the function of a plurality of smart cards.

Still another object of the invention is to prevent communication between any two segments of memory bearing enabling data from smart cards for smart cards.

An additional object of the invention is to enable connection to most port or connection configurations employed with computers.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is an environmental, exploded, diagrammatic view of the invention.

FIG. 2 is a cross section view of a smart card seen at the far right of FIG. 1.

DETAILED DESCRIPTION OF THE PREFERRED EMBODIMENTS

As seen in FIG. 1 of the drawings, the present invention is an intermediate peripheral device for a computer 2 as an interface for utilizing one or more smart cards 4. The invention comprises hardware components and associated software collectively comprising a security device generally designated 100. The invention is a security device for enabling selected functions to be performed, such as, accessing operating software to run the computer, or to protect programs or data contained in memory in computers. When utilized with computer 2 connected to security device 100, security device 100 enables the connected computer 2 to access protected programs or data directly or to perform other functions in connection with other remote computers (not shown). For example, connected computer 2 may conduct transactions with a single remote computer of a commercial entity, or a larger network of computers such as the Internet. For purposes of explanation, then, connected computer 2 will be understood to encompass one computer or a larger network.

The purpose of security device 100 is twofold. One is to provide an interface between computer 2 and smart card 4. The other is to enable only authorized access to the computer, programs, accounts, and other sensitive data by computer. As an interface, security device 100 greatly expands the ability of a single smart card 4 to be connected to a variety of different type computers. Additionally, a single card may be quite limited in its abilities to control computer 2. For example, smart card 4 has an integral memory chip for storing encrypted authorization passwords, algorithms, and other software enabling a computer to operate or communicate with protected or restricted programs. These passwords, algorithms, and other software will be termed "enabling data", hereinafter. But these enabling data are only for accessing one brand/type program or data.

Further, there remains the problem that card 4 and integral memory chip 6 must be provided, stored and repeatedly handled in order to use the computer, programs or data. This characteristic leads to increased cost and trouble. The present invention eliminates necessity for multiple smart cards 4 by creating virtual tokens in non-volatile memory 114 in the control module 108.

To accomplish this, security device 100 comprises a card reader 102 having a receptacle 104 and contacts 106. Contacts 106 correspond to contacts 8 located on the face of smart card 4 (see FIG. 2). When fully inserted into receptacle 104, contacts 8 align and establish electrical communication with contacts 106.

Card reader 102 communicates with a control module 108, as represented by communications conductor 110. Control module 108 includes processing means 112 for executing commands and monitoring for authorization, a segmented NVM 114 for providing virtual tokens, and an optional special purpose math coprocessor 116 for accelerating encryption and decryption of data. Processing means 112 has an automatic recording means 118 to enter enabling data into the segmented NVM 114 from smart card 4 through card reader 102 without aid of computer 2.

Processing means 112 includes all signals, power, and protocol required for a connected computer to access a virtual token. Processing means 112 enables execution commands to be operably communicated, if detected by recognition means 120, to selected protected programs contained in the memory of computer 2 connected to security device 100, or, of course, contained in a greater network as discussed prior. Recognition means 120 detects and verifies appropriate enabling data entered into segmented NVM 114. Processing means 112 includes a disabling inhibitor 122 for preventing execution commands originating at connected computer 2 to be recognized by processing means 112 if recognition means 120 cannot detect and verify appropriate enabling data entered into segmented NVM 114.

Each virtual token is protected from unauthorized access through the use of passwords, data encryption, or other security means by control module 108. Enabling data may be encrypted prior to storage in segmented NVM 114.

Enabling data or other data may be decrypted for recognition and for enabling execution commands originating at connected computer 2 to access computer 2 protected programs or data responsive to recognition of encrypted enabling data entered in segmented NVM 114. These functions may be performed by execution processor 112 in conjunction with encryption and decryption coprocessor 116. In addition, encryption may be employed in sending data over common carrier lines such as the national telephone grid. In the latter case, it is contemplated that received data would be encrypted and would require decryption to render it useful to computer 2. Therefore, non-volatile memory 114 and math coprocessor 116 may also be employed for this function. Encryption and decryption are well known functions, and need not be set forth in detail herein.

Considering the overall construction of security device 100, it is obvious that communication signal conductors 124, 126, 128, 130, 132, 134, 136, and 138 are provided where needed to enable communication among the various components of security device 100. These conductors 124, 126, 128, 130, 132, 134, 136, 138 are shown representatively only, and will be understood to extend to each component even if not specifically shown. Illustratively, conductor 110 extends to and includes sufficient individual conductive paths to communicate with individual contacts 106 of card reader 102.

Security device 100 includes a plurality of interface apparatuses for connection to computers generally. Only one interface is required for connection to a communication port 10 of computer 2. Since the specific type of connection provided at any one computer may not be predicted, security device 100 has PCMCIA interface 140, serial port interface 142, parallel port interface 144, and universal serial bus interface 146. Of course, the number of types of interfaces may be varied as desired, and may extend to still other types of interface configurations. The choice of interface apparatuses provided integrally with security device 100 is sufficiently great to assure that almost all commercially available computers may be compatible with security device 100.

It is to be understood that the present invention is not limited to the embodiments described above, but encompasses any and all embodiments within the scope of the following claims.

We claim:

1. A security device for enabling selected functions to be performed to protected programs or data contained in memory in computers, or other functions performed by or within a computer connected to said security device, said security device comprising:

a smart card reader having means for communicating with a smart card having memory;

a control module having a segmented non-volatile memory, said segmented non-volatile memory including a plurality of segments of non-volatile memory, means for selectively entering enabling data into said plurality of segments of non-volatile memory from a plurality of smart cards, through said smart card reader, recognition means for detecting enabling data entered into each segment of said plurality of segments of non-volatile memory, processing means for enabling execution commands to be operably communicated to selected protected programs or data contained in the memory of a computer connected to said security device responsive to detection of enabling data by said recognition means, processing means for enabling execution commands to allow operation of a computer or specific functions of the computer connected to said security device, and disabling means for preventing execution commands originating at the connected computer to be recognized by said processing means absent detection of enabling data by said recognition means; and interface means for enabling communication between said control module, said interface means, and a computer connected to said interface means, said interface means including at least one type of interface apparatuses connectable to computers;

whereby a computer user having multiple protected application programs that will not run, unless a physical smart card carrying unlocking means is physically inserted into a smart card reader, may successively physically insert a plurality of physical smart cards into said smart card reader a single time because said unlocking means of each physical smart card is copied and stored in a segment of non-volatile memory in said control module as a virtual smart card and is activated when needed in the absence of a need to reinsert its associated physical smart card.

2. The security device according to claim 1, said recognition means further comprising encryption and decryption means for encrypting enabling data prior to storage of said enabling data in said plurality of segments of non-volatile memory and for recognizing encrypted enabling data entered in said plurality of segments of non-volatile memory, and for enabling execution commands originating at a connected computer to access protected programs or data responsive to recognition of encrypted enabling data entered in said plurality of segments of non-volatile memory.

3. The security device according to claim 1, further comprising means for preventing communication between any two segments of non-volatile memory responsive to commands originating at a connected computer, said means for preventing communication being a separation of each segment of non-volatile memory from all other segments of non-volatile memory.

4. The security device according to claim 1, said control module further comprising automatic recording means for entering enabling data into said plurality of segments of non-volatile memory from said plurality of physical smart cards through said smart card reader.

5. The security device of claim 1, said interface means further comprising a control means for scanning said at least one type of interface apparatuses to determine which interface is in communication with said computer and for translating from one interface protocol to another.

6. The security device of claim 1, said at least one type of interface means further comprising a PCMCIA card socket interface.

7. The security device of claim 1, said at least one type of interface means further comprising a parallel port interface.

8. The security device of claim 1, said at least one type of interface means further comprising a serial port interface.

9. The security device of claim 1, said at least one type of interface means further comprising a universal serial bus interface.

* * * * *